US012662329B2

(12) United States Patent
Masotti et al.

(10) Patent No.: US 12,662,329 B2
(45) Date of Patent: Jun. 23, 2026

(54) FEEDING SYSTEM FOR COTTON WRAPPED STICKS

(71) Applicant: BORGHI S.P.A., Castelfranco Emilia (IT)

(72) Inventors: Carlo Masotti, Castelfranco Emilia (IT); Paolo Poli, Castelfranco Emilia (IT)

(73) Assignee: BORGHI S.P.A., Castelfranco Emilia (IT)

( * ) Notice: Subject to any disclaimer, the term of this patent is extended or adjusted under 35 U.S.C. 154(b) by 77 days.

(21) Appl. No.: 18/841,013

(22) PCT Filed: Mar. 3, 2023

(86) PCT No.: PCT/IB2023/051997
§ 371 (c)(1),
(2) Date: Aug. 23, 2024

(87) PCT Pub. No.: WO2023/170529
PCT Pub. Date: Sep. 14, 2023

(65) Prior Publication Data
US 2025/0187850 A1 Jun. 12, 2025

(30) Foreign Application Priority Data
Mar. 7, 2022 (IT) ........................ 102022000004265

(51) Int. Cl.
| | |
|---|---|
| *B65G 47/32* | (2006.01) |
| *B65B 35/10* | (2006.01) |
| *B65B 35/20* | (2006.01) |
| *B65G 15/42* | (2006.01) |

(Continued)

(52) U.S. Cl.
CPC .............. *B65G 47/32* (2013.01); *B65B 35/10* (2013.01); *B65B 35/205* (2013.01); *B65G 15/42* (2013.01);
(Continued)

(58) Field of Classification Search
CPC ........ B65G 47/32; B65G 47/30; B65G 47/31; B65G 15/42; B65G 19/02; B65G 47/1471;
(Continued)

(56) References Cited

U.S. PATENT DOCUMENTS

| | | | |
|---|---|---|---|
| 808,067 A | 12/1905 | Briggs | |
| 2,629,501 A * | 2/1953 | Curioni | ................... B65B 35/06 414/21 |

(Continued)

OTHER PUBLICATIONS

International Search Report (ISR) issued Jun. 9, 2023 in International (PCT) Application No. PCT/IB2023/051997.

*Primary Examiner* — Mark A Deuble
(74) *Attorney, Agent, or Firm* — Wenderoth, Lind & Ponack, L.L.P.

(57) ABSTRACT
A feeding system for cotton or flocked sticks comprises a first feeding assembly for moving first groups of sticks along a first feeding direction, a first storage compartment adapted to receive at least one first group of sticks from first feeding assembly, a transfer assembly for transferring a second group of sticks from said first storage compartment to a second storage compartment, a transfer drum rotatable and provided on an external side wall thereof with a plurality of first seats configured to remove from the second storage compartment and house respective sticks and a feeding duct to receive one stick at a time from the transfer drum and convey the stick to a second feeding assembly.

17 Claims, 5 Drawing Sheets

(51) Int. Cl.
*B65G 19/02* (2006.01)
*B65G 47/14* (2006.01)
*B65G 47/84* (2006.01)

(52) U.S. Cl.
CPC ......... *B65G 19/02* (2013.01); *B65G 47/1471* (2013.01); *B65G 47/84* (2013.01); *B65G 47/846* (2013.01); *B65G 47/841* (2013.01)

(58) Field of Classification Search
CPC .... B65G 47/84; B65G 47/848; B65G 47/846; B65G 47/841; B65B 35/10; B65B 35/205
See application file for complete search history.

(56) References Cited

U.S. PATENT DOCUMENTS

| | | | | |
|---|---|---|---|---|
| 3,405,579 A | * | 10/1968 | London | A24C 5/478 198/450 |
| 3,682,293 A | * | 8/1972 | Kamp | B65H 67/061 198/383 |
| 3,887,059 A | * | 6/1975 | Verjux | A24C 5/478 198/452 |
| 4,296,660 A | * | 10/1981 | Cristiani | A24C 5/325 83/155.1 |
| 4,327,825 A | * | 5/1982 | Ackley, Sr. | B65G 47/1471 198/397.06 |
| 4,416,368 A | * | 11/1983 | Muramatsu | B65G 15/14 198/607 |
| 5,333,718 A | | 8/1994 | Pannell et al. | |
| 5,996,310 A | * | 12/1999 | Bailey | B65B 43/185 53/228 |
| 6,189,679 B1 | | 2/2001 | Grinder | |
| 7,530,444 B2 | * | 5/2009 | Draghetti | B65G 47/08 198/474.1 |
| 7,565,963 B2 | * | 7/2009 | Cholet | A24C 5/35 198/525 |
| 11,744,279 B2 | * | 9/2023 | Stanikowski | B65G 47/19 198/571 |
| 2021/0022353 A1 | * | 1/2021 | Baechtle | A22C 11/0236 |

* cited by examiner

FEEDING SYSTEM FOR COTTON WRAPPED STICKS

The present invention relates to apparatuses and systems for supplying cotton wrapped or flocked sticks to a subsequent packaging machine for packaging the said cotton wrapped or flocked sticks, and in particular relates to a feeding system for singly providing the cotton wrapped or flocked sticks to the packaging machine.

As is known, cotton wrapped sticks or cotton swab or rods or buds are made from a stick, rod, bud typically made of extruded plastic or of wood, at one end of which are wound long cotton fibres until said end is totally covered.

Flocked sticks, on the other hand, are made from a stick, generally made of moulded plastic, at one end of which an adhesive substance is applied on which short cotton fibres are deposited until this end is completely covered.

Flocked or cotton wrapped sticks have various applications in the medical and forensic fields, where they are used to carry out sampling of substances to be analysed.

Generally, at the end of the production process, the cotton wrapped or flocked sticks are collected and stored in groups or bundles of 50-200 partially ordered units, with all having the flocked or cotton wrapped end on the same side.

However, for the uses for which they are intended (in particular for hygienic and aseptic reasons and to protect them from possible contamination) the cotton wrapped or flocked sticks must be singly packaged.

The final packaging process of the cotton wrapped or flocked sticks can be carried out in an automated way by using special packaging machines, which must however be fed by singularizing, i.e. singling out the single cotton wrapped or flocked sticks, which are instead supplied in groups or bundles. This feeding process of the single sticks, also called singularizing process, is often carried out manually due to the complexity and functional and operational limits of the automatic systems for singly feeding the cotton wrapped or flocked sticks, so-called singularizing systems.

Over time, various types of singularizing systems have been developed that are however capable to separate the cotton wrapped or flocked sticks in a reliable and safe way only with a low speed with respect to the operation speed required by the packaging machines.

Reliable and high-performance singularizing systems are also known, but only by processing cotton wrapped or flocked sticks of a limited range of sizes.

It is an object of the present invention to improve the feeding systems known in order to singularize, i.e. to singly provide, the cotton wrapped or flocked sticks with which to feed a subsequent packaging machine.

Another object is to provide a feeding system that enables reliable and safe separating of any type of cotton wrapped or flocked stick at high operating speeds or rates, even greater than that typical of packaging machines.

A further object is to provide a feeding system having simple and economical construction and precise and reliable operation.

These and other objects are achieved by a feeding system for cotton wrapped or flocked sticks according to one or more of the claims set out below.

The invention will be better understood and implemented with reference to the attached drawings which illustrate an exemplary and non-limiting embodiment thereof, wherein.

Figure 1:
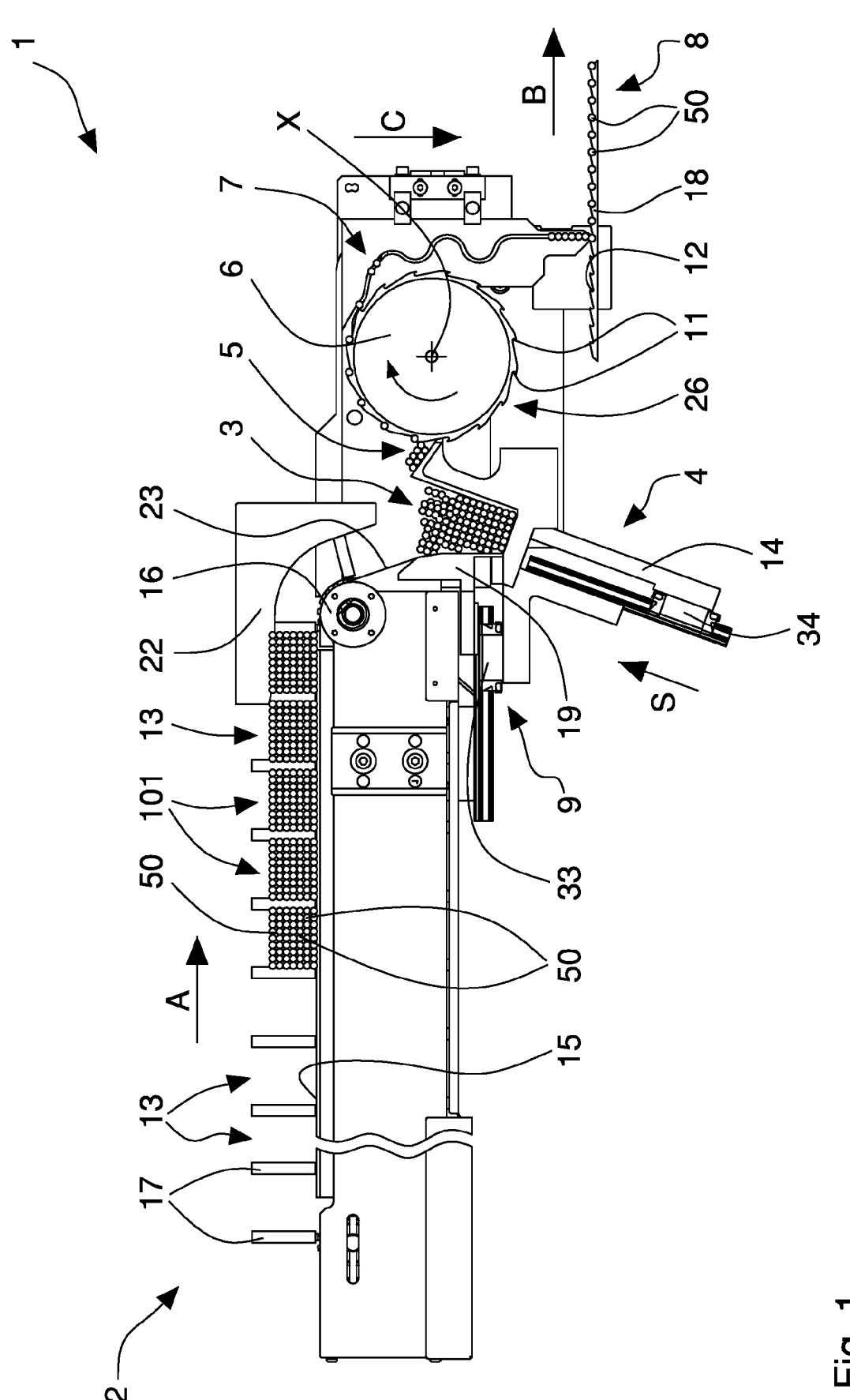
FIG. 1 is an interrupted front view of the feeding system of the invention in an operating phase.
Figure 2:
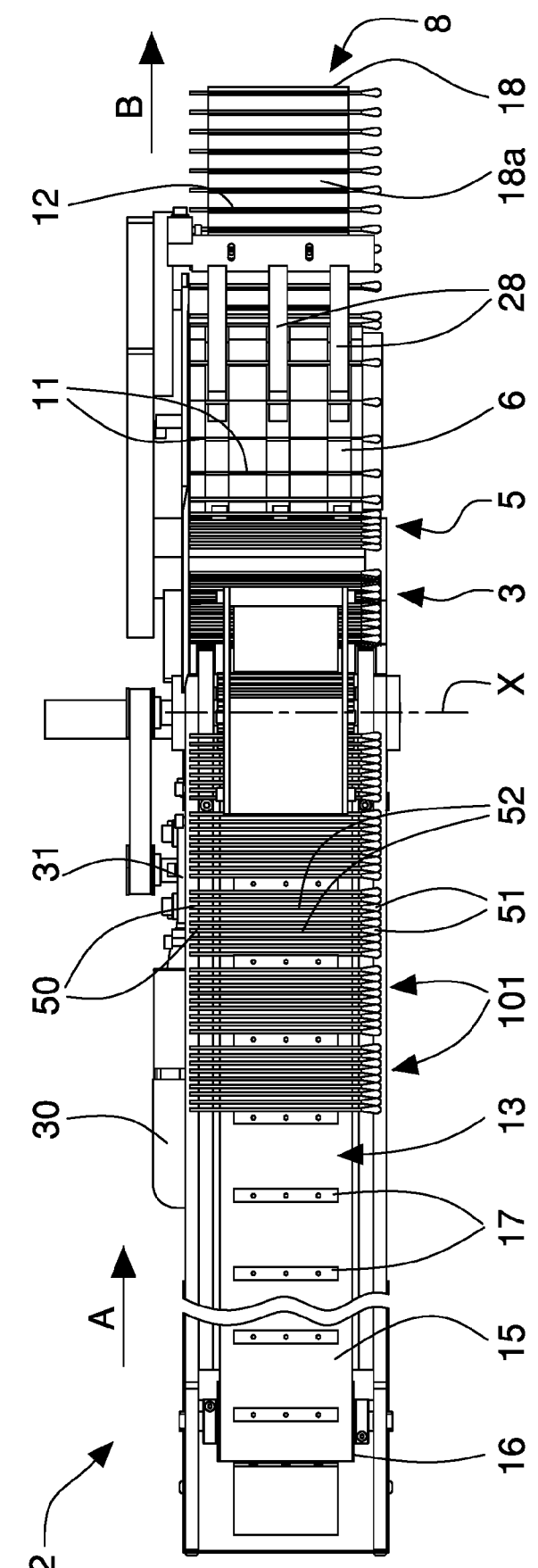
FIG. 2 shows a plan view from above of the feeding system of FIG. 1.
Figure 3:
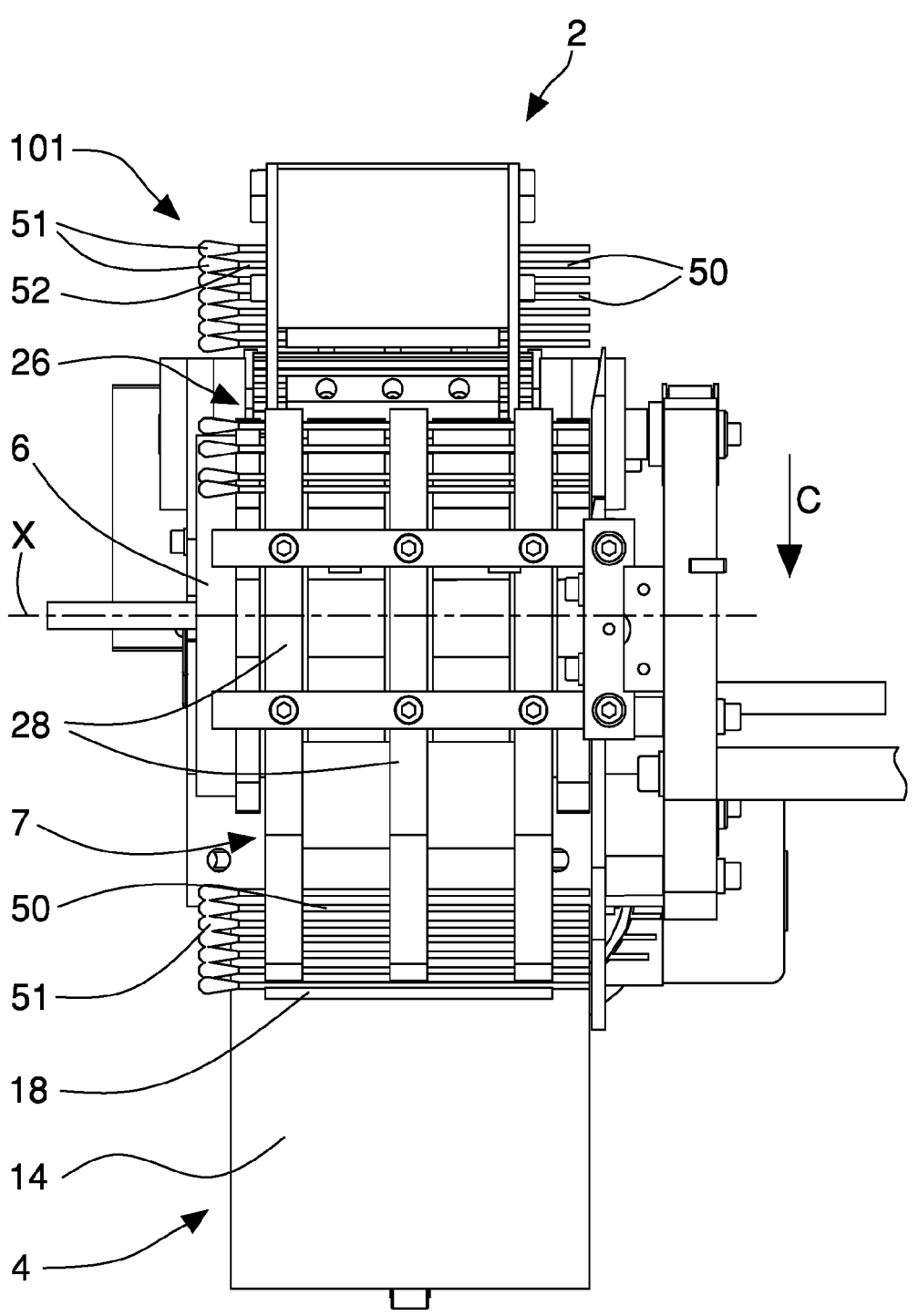
FIG. 3 is an enlarged side view of the feeding system of FIG. 1.
Figure 4:
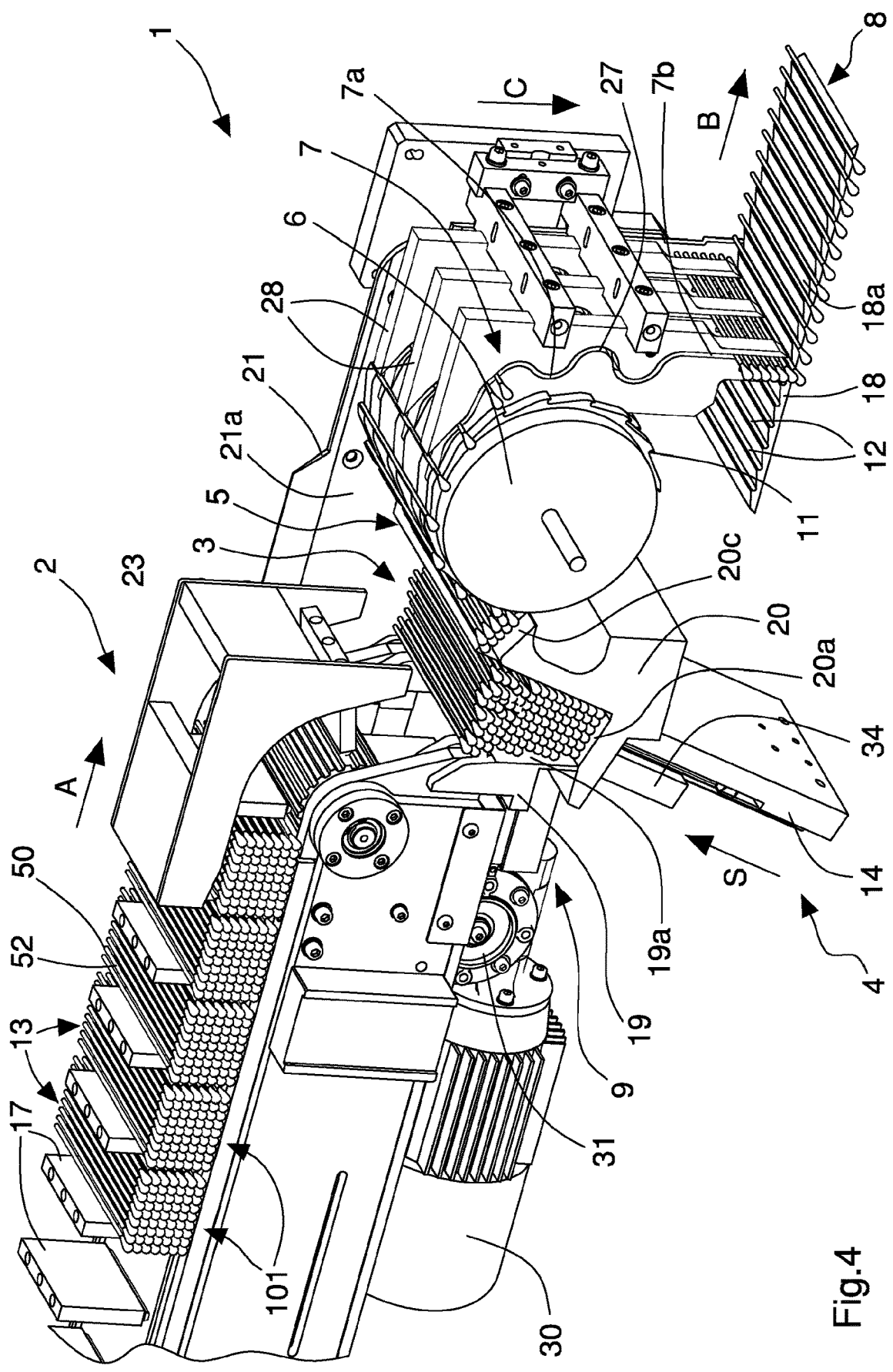
FIG. 4 is an enlarged partial perspective view of the feeding system of FIG. 1.

With reference to FIGS. 1 to 6, the feeding system 1 of the invention for cotton wrapped or flocked sticks 50, or sticks 50 for brevity, having at least one cotton wrapped or flocked end 51, in particular for sticks or rods or buds 50 having a body 52, in particular elongated and made of plastic or wood, having an end 51 around which long cotton fibres are wrapped (cotton wrapped sticks or cotton swab) or short cotton fibres are axed by means of adhesive (flocked sticks) until the end 51 is completely covered.

The feeding system 1 comprises first feeding means 2 for moving first groups 101 of loose sticks 50 along a first feeding direction A, a first storage compartment 3 adapted to receive one first group 101 of sticks at a time from the first feeding means 2, transfer means 4 for transferring one second group 102 of sticks at a time from the first storage compartment 3 to a second storage compartment 5 and a transfer drum 6 rotatable about a rotation axis X.

The transfer drum 6 comprises an external side wall 26 provided with a plurality of first seats 11 angularly spaced along said external side wall 26. Each first seat 11 is shaped so as to pick up a respective stick 50 from the second storage compartment 5 and house it. More precisely, each first seat 11 of the transfer drum 6 is shaped so as to pick up a respective single stick 50 from the plurality of sticks 50 housed in the second storage compartment 5, in this way singularizing, i.e. singling out, the single cotton wrapped or flocked sticks 50, which are provided to the feeding system 1 in groups or bundles (first groups 101 of loose sticks).

The feeding system 1 further comprises a feeding duct 7 configured to receive one stick 50 at a time released from the transfer drum 6 and convey the stick by gravity along a supply direction C, and second feeding means 8 adapted to singly receive the sticks 50 from the feeding duct 7 and move the sticks along a second feeding direction B. The second feeding means 8 are provided with second seats 12 regularly spaced along the second feeding direction B. Each second seat 12 is configured to pick up from the feeding duct 7 and house a respective stick 50.

The feeding system 1 also comprises shaking means 9 comprising at least one shaking element 19 which forms a rear wall 19a of the first storage compartment 3 and is movable with a reciprocating motion so as to stir, shake, vibrate the sticks 50 housed in the first storage compartment 3 so as to order and compact them.

The first feeding means 2 comprise a plurality of housings 13 arranged aligned one behind the other along the first feeding direction A, each housing 13 being configured to receive a respective first group 101 of loose sticks. The sticks 50 of the first groups 101 of sticks are arranged in the housings 13 substantially orthogonal to the first feeding direction A and with the cotton wrapped or flocked ends 51 arranged on the same side, adjacent and in contact with each other.

In particular, in the embodiment shown in the figures, the first feeding means 2 comprise a first belt 15, or band, wrapped around pulleys 16 and supporting a plurality of separating elements 17, regularly spaced, parallel to each other and almost orthogonal to the first feeding direction A.

Each pair of adjacent separating elements 17 forms a respective housing 13 adapted to contain a respective first group or bundle 101 of sticks.

In particular, the first belt 15 is a toothed belt or band wrapped around at least two, also toothed, pulleys 16, one of which is rotated by first motor means 30 comprising, for example, a rotary electric motor 31, a speed reducer 32, by means of motion transmission means of known type and not illustrated in the figures.

The first feeding means 2, i.e. the first belt 15, are operated with intermittent step motion. The first storage compartment 3 is placed downstream of the first feeding means 2, with reference to the feeding direction A, and is formed by a first base wall 20a and a front wall 20b of a first supporting element 20, by a side wall 21a of a second supporting element 21, and by the rear wall 19a of the shaking element 19.

The rear wall 19a of the shaking element 19 is for example substantially vertical, while the front wall 20b of the first supporting element 20 is inclined towards the transfer drum 6 by an angle of about 20° with respect to a vertical direction. Likewise, the first base wall 20a of the first supporting element 20 is inclined at an angle of about 20° so as to be almost perpendicular to the front wall 20b.

The shaking element 19 is moved with alternating linear motion by first actuating means 33 for example of the pneumatic type.

Guide means 22, 23 are provided at the end of the first feeding means 2 facing the first storage compartment 3 for guiding the groups of sticks 50 out of the first feeding means 2.

In particular, the guide means comprise a pair of upper guides 22 having an arcuate shape and configured to abut the bodies 52 of the sticks 50 arranged at the top in each first group 101 of sticks, and a pair of lower guides 23 having an arcuate shape and configured to abut the bodies 52 of the sticks 50 arranged at the bottom in each first group 101 of sticks.

Figures 5, 6:
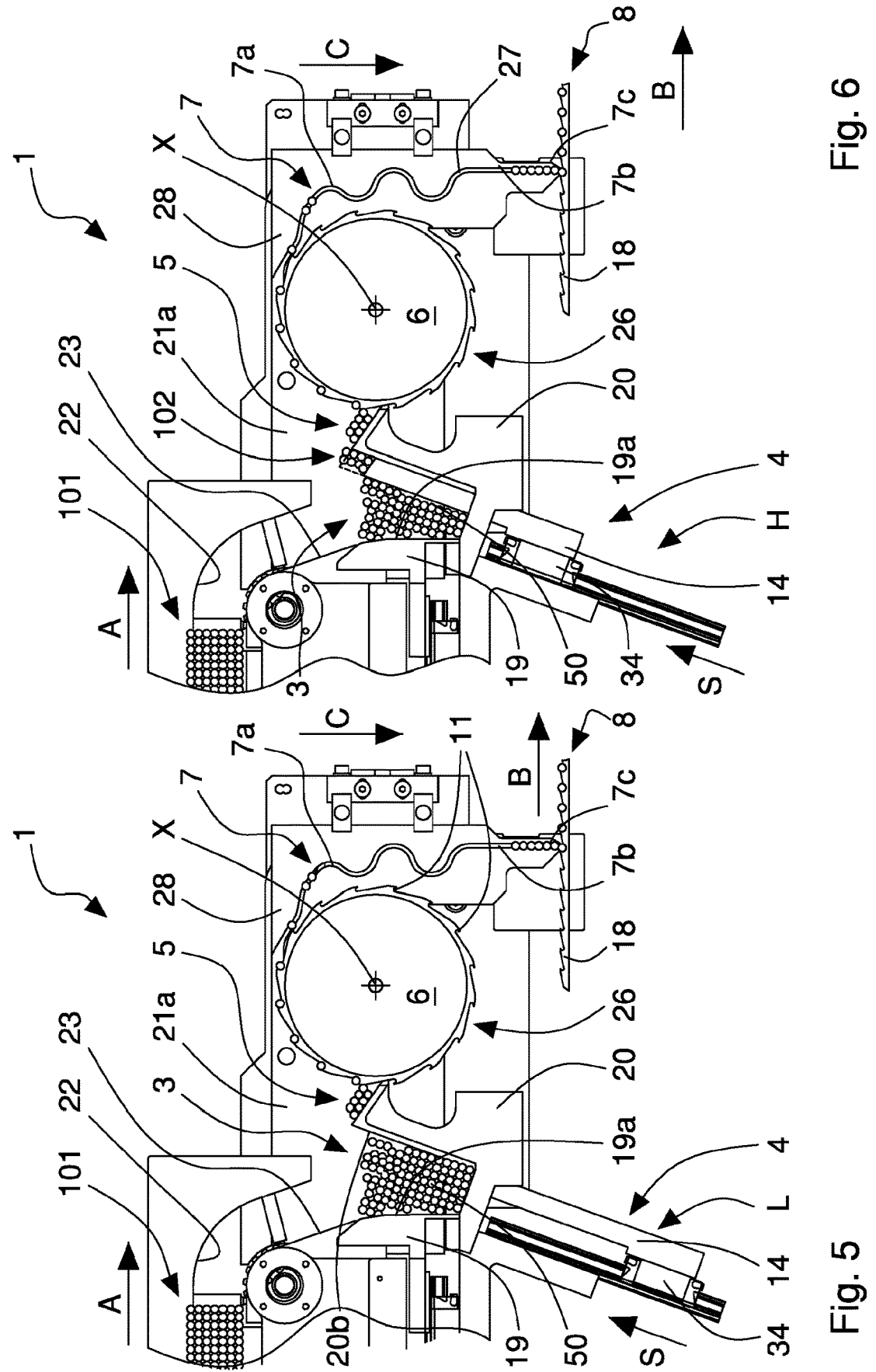
FIG. 5 is an enlarged detail of FIG. 1, illustrating in particular transfer means of the feeding system in a lowered position.
FIG. 6 is a view of the detail of FIG. 5 which illustrates in particular the transfer means in lowered raised position.

The transfer means 4 comprise a transfer element 14 movable along a transfer direction S and configured to pick up and transfer a second group 102 of sticks from the first storage compartment 3 to the second storage compartment 5 (FIG. 6).

In the illustrated embodiment, the second storage compartment 5 is positioned above the first storage compartment 3 and the transfer element 14 slides along and on the front wall 20b of the first supporting element 20 to lift a second group 102 of sticks.

The transfer element 14 is moved in a controlled manner with linear motion by second actuating means 34, for example of the pneumatic type, between a lowered position L, wherein an upper contact wall 14a of the transfer element that contacts the sticks 50 is substantially aligned with the first base wall 20a of the first supporting element 20, and a final raised position H, wherein its upper contact wall 14 is substantially aligned with a second base wall 20c of the first supporting element 20.

The second storage compartment 5 is formed by the second base wall 20c of the first supporting element 20, the side wall 21a of the second supporting element 21, and the external side surface 26 of the transfer drum 6.

The second base wall 20c is inclined towards the transfer drum 6, for example by an angle of approximately 35° to convey the sticks 50 by gravity towards the external side surface 26 of the transfer drum 6.

The rotation axis X of the transfer drum 6 is substantially horizontal and orthogonal to the first feeding direction A and the first seats 11 made on its external side surface 26 extend in a parallel way with respect to the rotation axis X and are shaped so as to house the body 52 of the sticks 50.

The transfer drum 6 is driven with continuous rotation motion, for example by second motor means by respective motion transmission means both of known type and not illustrated in the figures.

The feeding duct 7 extends orthogonally to the first feeding direction A and is shaped so as to receive the body 52 of the sticks 50 and convey the latter towards the second feeding means 8 keeping them almost orthogonal to the first feeding direction A.

For this purpose the feeding duct 7 comprises a first section 7a having a curvilinear, undulating, serpentine profile and a second section 7b that is substantially rectilinear and vertical and has an opening 7c for the outlet of the sticks 50. The first section 7a shaped with loops and curves allows a controlled descent of the sticks 50 by gravity along the supply direction C which prevents the sticks 50 from tilting and getting stuck in the feeding duct 7. In the embodiment illustrated in the figures, the feeding duct 7 is formed by a plurality of through grooves 27 made on respective guiding elements 28 arranged spaced apart and parallel to each other and to the first feeding direction A. This configuration allows the sticks 50 to be effectively guided along the supply direction C abutting them only at three portions of their body 52, this allowing to reduce friction in the sliding of the sticks inside the feeding duct 7 and thus to facilitate their conveyance towards the underlying second feeding means 8.

In the substantially straight and vertical second section 7b the sticks 50 accumulate one above the other waiting to be picked up by the second feeding means 8.

In the illustrated embodiment the second feeding means 8 comprise a picking element 18 which moves linearly and alternately back and forth, i.e. in both directions along the second feeding direction B to pick up the sticks 50 from the feeding duct 7 and move them in a forward stroke and to return to an initial position in a return stroke.

The picking element 18 comprises an upper surface 18a provided with the second seats 12 that extend orthogonally to the second feeding direction B and are shaped to house the body 52 of the sticks 50. The second feeding direction B is parallel to the first feeding direction A.

In the forward stroke, the second seats 12 of the picking element 8 pick up the sticks 50 exiting the feeding duct 7 one at a time.

In the return stroke, in which the second seats 12 are empty since the sticks 50 have been given to a subsequent packaging machine or station, closure means of known type and not illustrated in the figures prevent the sticks 50 from exiting the opening 7c of the feeding duct 7 until the picking element 18 has returned to its initial position in which a first second seat 12 thereof is aligned and below the opening 7c of the feeding duct 7.

Alternatively, in a variant of the feeding system 1 not illustrated, second feeding means 8 may comprise an endless second belt, having an outer surface provided with the second seats 12 extending orthogonally to the second feeding direction B. The second belt is a belt or a band wound around at least two pulleys, one of which is rotated by respective motor means and motion transmission means.

The second belt can be driven with continuous or intermittent motion depending on the needs of the packaging machine or station that is positioned downstream of the feeding system 1. The feeding system 1 comprises a control unit, of known type and not shown, configured to control and manage the operation of first feeding means 2, transfer means 4, transfer drum 6, second feeding means 8 and shaking means 9. In particular, the control unit is connected to and controls the first and second motor means and the first and second actuating means 33, 34.

The control unit is also configured to connect and interface with the control unit of a packaging machine that is associated with and positioned downstream of the feeding system 1 of the invention.

The first seats 11 of transfer drum 6 and the second seats 12 of second feeding means 8 have a saw tooth profile with reference to a vertical plane almost parallel to the first feeding direction A. Thanks to this shape, each first seat 11 of transfer drum 6 is able to pick up a respective single stick 50 from the second storage compartment 5 and lift, transfer and pass the stick to the feeding duct 7.

Similarly, thanks to such shape, each second seat 12 of the picking element 18 is capable of picking up a respective single stick 50 exiting the feeding duct 7 and housing the stick therein so as to move the stick along the second feeding direction B, for example towards a subsequent machine or station for packaging the sticks 50.

The operation of the feeding system 1 of the invention provides for an operator to manually load the first groups or bundles 101 of sticks on the first feeding means 2 and starting the feeding system 1. In particular, during the start-up step and progressively during the operation of the system 1, the operator inserts a respective first group 101 of loose sticks into each of the empty housings 13, arranging the first group so that the cotton wrapped or flocked ends 51 of the sticks 50 of the corresponding first group 101 are on the same side, adjacent and in contact with each other.

During the feed with intermittent step motion the first groups 101 of sticks are moved along the first feeding direction A up to the first storage compartment 3. More precisely, by moving the first belt 15 the housings 13 are advanced so that in sequence one or more of first groups 101 of sticks are transferred into the first storage compartment 3. The guide means 22, 23 associated with the first feeding means 2 allow all the sticks 50 of a first group 101 of sticks to be transferred into the first storage compartment 3 keeping the sticks parallel to each other and orthogonal to the first feeding direction A.

The movement of the first feeding means 2 is activated by the control unit when the storage compartment 3 is almost empty or after a certain time interval that can be calculated according to a rotation speed of the transfer drum 6 and the number of first seats 11 present on the external side wall 26 of the transfer drum.

The sticks 50 housed in the first storage compartment 3 are correctly aligned and compacted inside the first storage compartment 3 also as a result of the shaking element 19 of the shaking means 9 which forms one of the side walls of the said first storage compartment 3 and vibrates or moves with a reciprocating motion.

The transfer element 14 of transfer means 4 is progressively moved along the transfer direction S so as to transfer a second group 102 of sticks 50, in particular of variable number, into the second storage compartment 5 from which the sticks 50 are taken one at a time from the transfer drum 6. Linear movement of the transferring element 14 is regulated by the control unit acting on the second actuating means 34 of the transfer means 4, for example with intermittent motion, so as to constantly feed the second storage compartment 5 with sticks 50.

Inside the second storage compartment, the sticks 50 slide by gravity against the external side wall 26 of the transfer drum 6, thanks to the inclination of second base wall 20c of first supporting element 20 and are thus progressively taken up one at a time from the first seats 11 made on the external side wall 26.

In particular, each first seat 11 thanks to its saw tooth shape and thanks to the rotation (clockwise with reference to the view in the figures) of the transfer drum 6, is capable to pick up, lift and transfer a respective single stick 50 from the second storage compartment 5 to the feeding duct 7, keeping the stick 50 orthogonal to the first feeding direction A, that is, parallel to the rotation axis X of the transfer drum 6. The transfer drum 6 thanks to its first seats 11 provided on the external side wall 26, allows to singularize the cotton wrapped or flocked sticks 50, i.e. to separate the single sticks 50 that are provided to the feeding system 1 into groups or bundles (first groups 101 of sticks).

Each stick 50 released by the transfer drum 6 into the feeding duct 7 descends by gravity along the serpentine-shaped first section 7a and the vertical rectilinear second section 7b of the feeding duct 7. When fully operational, in the second section 7b a predefined number of sticks 50 are accumulated which overlap at the outlet 7c of the feeding duct 7 where they are picked up one at a time by the second feeding means 8.

In particular, the second seats 12 of the picking element 18 of the second feeding means 8, thanks to their saw-tooth shape, are capable to pick up the sticks 50 from the feeding duct 7 one at a time and then convey the sticks along the second feeding direction B exiting the feeding system 1, for example towards a subsequent packaging machine in which the sticks 50 are singly packaged.

Therefore the feeding system 1 of the invention is a singularizing system suitable for singularizing i.e. singly supplying outgoing cotton wrapped or flocked sticks 50 loaded thereon in groups or bundles of loose sticks (first groups 101 of sticks), in particular suitable for feeding the sticks 50 to a subsequent packaging machine or station.

In particular, thanks to its conformation, the feeding system 1 allows reliably and safely processing any type of cotton wrapped or flocked stick, rod, or bud 50. Any changes in the dimensions of the sticks 50 require in fact modifying, if necessary, only the transfer drum 6 and the picking element 18 of the second feeding means 8 to adapt the dimensions of the first and second seats 11, 12 intended to pick up and house the bodies 52 of the sticks 50.

Tests carried out by the applicant have shown that the feeding system 1 of the invention is capable to singularize the sticks 50, i.e. to provide single cotton wrapped or flocked sticks 50 exiting the second feeding means 8 in a reliable and precise way even at high operating speeds, equal to or even higher than speeds typical of the known packaging machines.

The invention claimed is:

1. A feeding system for cotton or flocked sticks having at least one cotton wrapped or flocked end, the feeding system comprising:
   a first feeding assembly for moving first groups of distinct and separate sticks along a first feeding direction;
   a first storage compartment adapted to receive at least one first group of sticks at a time from said first feeding assembly;
   transfer assembly for transferring one second group of sticks at a time from said first storage compartment to a second storage compartment;
   a transfer drum rotatable about a rotation axis and having an external side wall provided with a plurality of first seats angularly spaced along said external side wall, each first seat being configured to remove from said second storage compartment and house a respective single stick;

a feeding duct configured to receive one stick at a time released from said transfer drum and convey the stick by gravity along a feeding direction;

a second feeding assembly adapted to singly receive the sticks from said feeding duct and move the sticks along a second feeding direction, said second feeding assembly being provided with second seats regularly spaced along the second feeding direction, each second seat being configured to remove from said feeding duct and house a respective stick.

2. The feeding system according to claim 1, further comprising a shaking device including at least one shaking element adapted to form a rear wall of said first storage compartment and movable with reciprocating motion so as to move the sticks housed in said first storage compartment.

3. The feeding system according to claim 1, wherein said first feeding assembly comprises a plurality of housings arranged one behind the other along the first feeding direction, each housing being adapted to receive a respective first group of sticks, the sticks of said first group of sticks being arranged in said housings substantially orthogonal to the first feeding direction and with the cotton wrapped or flocked ends facing the same side.

4. The feeding system according to claim 1, wherein said first feeding assembly comprises at least one endless first belt wrapped around pulleys and supporting a plurality of separating elements, spaced apart and parallel to each other and substantially orthogonal to the first feeding direction, a pair of adjacent separating elements forming a respective housing.

5. The feeding system according to claim 1, wherein said transfer assembly comprises at least one transfer element movable along a transfer direction and configured to pick up and transfer the second group of sticks from said first storage compartment to said second storage compartment.

6. The feeding system according claim 2, further comprising a first supporting element provided with a first base wall and a front wall and a second supporting element provided with a side wall, wherein said first base wall, said front wall, said side wall and said rear wall formed of said shaking element form said first storage compartment that is positioned downstream of said first feeding assembly with reference to the first feeding direction.

7. The feeding system according to claim 6, wherein said first supporting element comprises a second base wall, and said second base wall, said side wall of said second supporting element and said external side wall of said transfer drum forming said second storage compartment.

8. The feeding system according to claim 1, wherein the rotation axis is substantially horizontal and orthogonal to the first feeding direction.

9. The feeding system according to claim 1, wherein said first seats of said transfer drum extend parallel to the rotation axis and are configured to house bodies of the sticks.

10. The feeding system according to claim 1, wherein said feeding duct extends orthogonally to the first feeding direction so as to receive bodies of the sticks and convey the sticks by gravity towards said second feeding assembly keeping them practically orthogonal to the first feeding direction.

11. The feeding system according claim 1, wherein said feeding duct comprises a first section having a curvilinear extension and a second section substantially straight and vertical, provided with an opening for the exit of the sticks.

12. The feeding system according to claim 1, wherein said feeding duct is formed by a plurality of through grooves made on respective guiding elements arranged spaced apart and parallel to each other and to the first feeding direction.

13. The feeding system according to claim 1, wherein said second feeding assembly comprises a picking element movable along the second feeding direction alternatively in both ways to pick up from said feeding duct and move the sticks in a forward stroke and to return to an initial position in a return stroke.

14. The feeding system according to claim 13, wherein said picking element comprises an upper surface provided with said second seats which extend orthogonally to the second feeding direction and are configured to house bodies of the sticks.

15. The feeding system according to claim 1, wherein said first seats and said second seats have a saw tooth profile with reference to a vertical plane almost parallel to the first feeding direction.

16. The feeding system according to claim 7, wherein said second storage compartment is positioned above said first storage compartment.

17. The feeding system according to claim 14, wherein the second feeding direction is parallel to the first feeding direction.

* * * * *